United States Patent
Koskey

(10) Patent No.: US 10,624,316 B2
(45) Date of Patent: Apr. 21, 2020

(54) CONFIGURABLE CAT TOY

(71) Applicant: K&H MANUFACTURING, LLC, Colorado Springs, CO (US)

(72) Inventor: James Donald Koskey, Manitou Springs, IN (US)

(73) Assignee: K&H Manufacturing, LLC, Colorado Springs, CO (US)

( * ) Notice: Subject to any disclaimer, the term of this patent is extended or adjusted under 35 U.S.C. 154(b) by 124 days.

(21) Appl. No.: 15/907,247

(22) Filed: Feb. 27, 2018

(65) Prior Publication Data

US 2019/0261600 A1    Aug. 29, 2019

(51) Int. Cl.
*A01K 15/02* (2006.01)
*A63H 33/00* (2006.01)

(52) U.S. Cl.
CPC .......... *A01K 15/024* (2013.01); *A63H 33/003* (2013.01)

(58) Field of Classification Search
CPC .. A01K 15/024; A63H 33/003; A63H 33/067; A63F 9/0826; A63F 9/088; G09B 1/40
USPC ........ 446/487, 104, 113, 120, 376; 434/160, 434/193; 119/706, 702, 707
See application file for complete search history.

(56) References Cited

U.S. PATENT DOCUMENTS

| | | | | | |
|---|---|---|---|---|---|
| 3,315,376 | A | * | 4/1967 | Nielsen | G09B 1/40 434/160 |
| 4,114,307 | A | * | 9/1978 | Liebeskind | A63H 33/062 428/53 |
| 4,605,383 | A | * | 8/1986 | Horiuchi | A63H 33/003 446/376 |
| 6,135,851 | A | * | 10/2000 | Drake | A63H 33/062 273/243 |
| 8,210,898 | B2 | * | 7/2012 | Johnson | A63F 9/0826 434/160 |

FOREIGN PATENT DOCUMENTS

JP        2012000236 A  *  1/2012  .......... A63H 33/003

* cited by examiner

*Primary Examiner* — Yvonne R Abbott-Lewis
(74) *Attorney, Agent, or Firm* — Ice Miller, LLP

(57) ABSTRACT

The present disclosure relates to a configurable cat toy transformable between two different positions to provide different forms of the toy, including a first member, a second member being identical to the first member, a hingable connection operably connecting the first member and the second member in a first position, wherein the first member and second member are transformably rotatable relative to each other about the hingable connection, into a second position, and wherein, in the first position, the toy in a shape of letter A, and wherein, in the second position the toy is a sloped structure.

5 Claims, 3 Drawing Sheets

CONFIGURABLE CAT TOY

TECHNICAL FIELD

The present disclosure relates in general to a pet toy, and particularly, to a cat toy that includes connected cardboard scratching posts that are configurable.

BACKGROUND

Cats are athletic, agile, and energetic creatures. They are also popular as pet animals in many households. Cats, as part of their nature, need stimulation and activity. Helping cats exercise and stimulating them affords them mental benefits like reduced stress and anxiety, improved mood, and leads to overall healthier and better lives. Cats also have a natural urge to scratch. Scratching helps cats stretch and relax, and also allows them to shed old claw sheaths and sharpen new claws.

Many cat owners resort to scratching toys that allow cats to entertain themselves, whilst giving them the ability to scratch as well. However, each cat has different preferences. Finding the right cat scratch toy is important. For example, the effectiveness of a cat scratch toy is dependent on the size of the toy, the shape of the toy, the material used, and even the newness of the toy. Cat owners therefore, have to consider these various factors and select a cat toy accordingly. Cat owners can never be certain of what toy their cat(s) will like, until the toy is actually played with by the cat. This is problematic because cat owners may invest in the purchase of a toy, only to find out that their cat is not interested in the toy. Moreover, a cat may initially find interest in a new toy, but such interest can quickly wane.

Accordingly, a need exists for a cat toy which is configurable, keeps the interest of a cat, and provides the cat a resilient surface to scratch.

SUMMARY

The present disclosure relates to a configurable cat toy. In at least one embodiment of the present disclosure, the toy includes a structure substantially formed in the shape of letter 'A.' The toy includes at least two elements: a first member, and a second member, that are separable and combinable with each other, and each being transformable to different positions.

In at least one embodiment of the present disclosure the first member includes a first member distal end, a first member proximal end, and a medial portion between the first member distal end and the first member proximal end, the medial portion further including a first bar member.

In at least one embodiment of the present disclosure, the second member includes a second member distal end, a second member proximal end, and a medial portion between the second member distal end and the second member proximal end, the medial portion further including a second bar member In at least one embodiment of the present disclosure, the first member and second member are arranged such that the first member proximal end is adjacent to second member proximal end.

In at least one embodiment of the present disclosure, the toy includes a cavity created by the inner surfaces of the first member, second member, first bar member, and second bar member.

In at least one embodiment of the present disclosure, the toy includes a passage created by the inner surface of the first member distal end, inner surface of the second member distal end, and outer surface of first bar member, and outer surface of the second bar member.

In at least one embodiment of the present disclosure, the first member proximal end and the second member proximal end may be hingably connected via any means known to one having ordinary skill in the art.

In at least one embodiment of the present disclosure, the toy can be configured by operably pivoting the first member and second member, along a longitudinal axis, such that first member face and second member face are abutting each other In at least one embodiment of the present disclosure, the toy in the second position is substantially formed into the shape of a sloped structure In at least one embodiment of the present disclosure, the toy is rotated such that the outer planar surface operates as a base of the toy. In at least one embodiment of the present disclosure, the toy may be rotated such that the outer planar surface operates as a base of the toy

DETAILED DESCRIPTION

Reference will now be made in detail to the preferred embodiments of the present disclosure, examples of which are illustrated in the accompanying drawings. Additional features and advantages of the disclosure will be set forth in the description that follows, and will be apparent from the description, or may be learned by practice of the disclosure. It is to be understood that both the foregoing general description and the following detailed description are exemplary and explanatory and are intended to provide further explanation of the disclosure as claimed.

Figure 1:
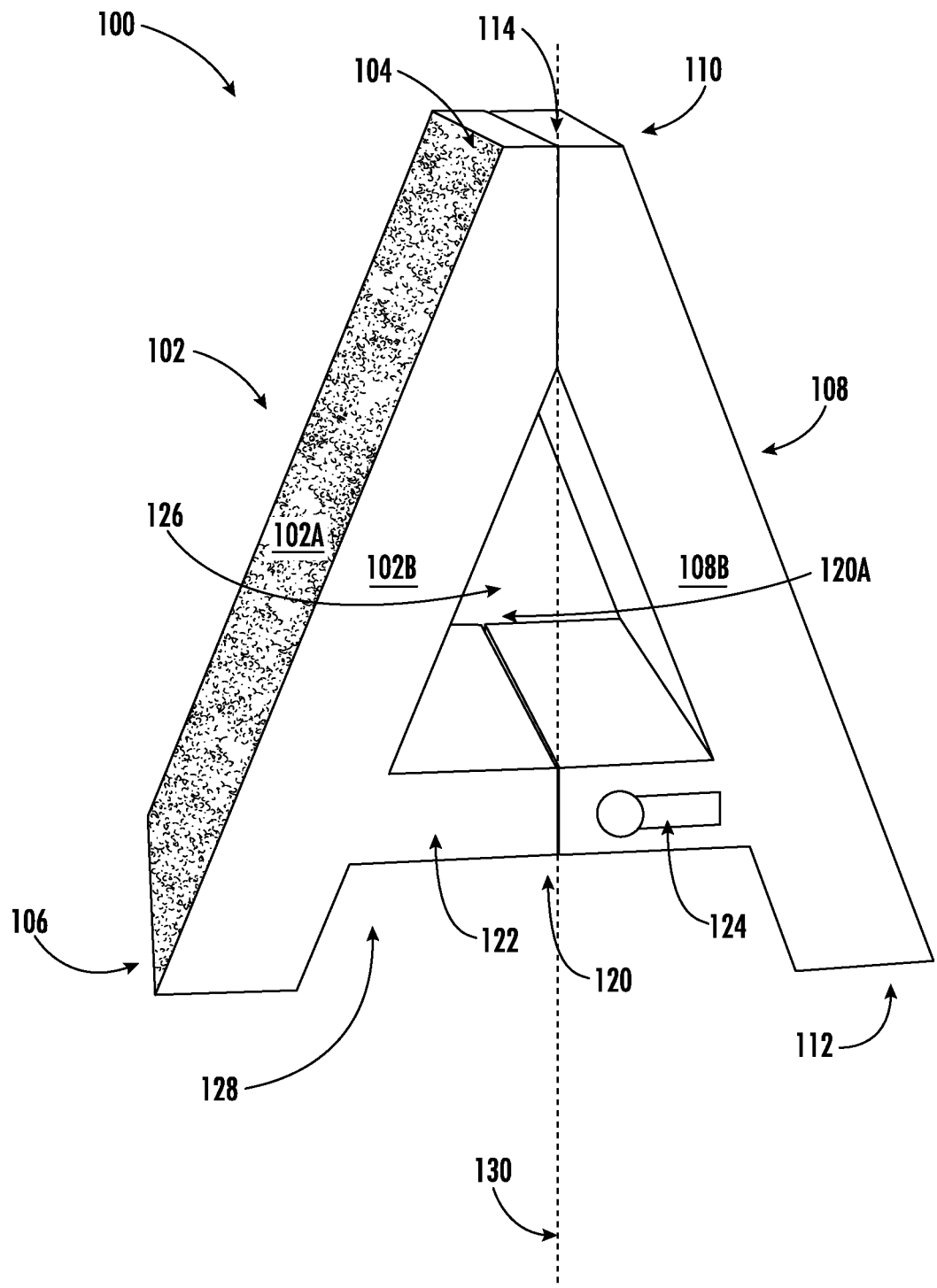
FIG. 1 is a front view of a configurable cat toy, in accordance with at least one embodiment of the present disclosure.

Referring now to FIG. 1, there is shown a configurable cat toy 100, in a first position, in accordance with at least one embodiment of the present disclosure. In at least one embodiment of the present disclosure, the toy 100 includes a structure substantially formed in the shape of letter 'A.' The toy 100 includes at least two elements: a first member 102, and a second member 108, that are separable and combinable with each other, and each being transformable to different positions as further disclosed herein. It will be appreciated that the first member 102 and second member 108 may be identically shaped, or mirrors of each other. In at least one embodiment of the present disclosure, the first member 102 and second member 108 each include an elongated segment, having an outer planar surface (i.e. 102A, and 108A, respectively), a front face (i.e. 102B, and 108B, respectively), and a back face (not shown). It will be appreciated that the first member 102 and second member 108 can have a width and thickness that is optimized for enabling scratching functions, as further described according to the present disclosure. It will be further appreciated that the toy 100 may be composed of any material well known to one having ordinary skill in the art, such as, for example, laminated cardboard, plastic, carpet, papier-mâché, textile, bonded polymers, wood, and the like.

The first member 102 includes a first member distal end 106, a first member proximal end 104, and a medial portion between the first member distal end 106 and the first member proximal end 104, the medial portion further including a first bar member 122. In at least one embodiment of the present disclosure, the first bar member 122 extends outwardly from the first member 102 at a non-orthogonal angle.

In at least one embodiment of the present disclosure, the second member 108 includes a second member distal end 112, a second member proximal end 110, and a medial portion between the second member distal end 112 and the second member proximal end 110, the medial portion further including a second bar member 124. In at least one embodiment of the present disclosure, the second bar member 124 extends outwardly from the second member 108 at a non-orthogonal angle.

In at least one embodiment of the present disclosure, the first member distal end 106 and the second member distal end 112 each feature an underside (not shown) wherein the undersides are in contact with a surface (e.g. a floor) when the toy 100 is configured in the first position.

In at least one embodiment of the present disclosure, the first member 102 and second member 108 are arranged such that the first member proximal end 104 is adjacent to second member proximal end 110, as shown in FIG. 1. It at least one embodiment of the present disclosure, the first bar member 122 and second bar member 124 are also arranged such that they are adjacent to each other, as shown in FIG. 1.

It will be appreciated that the first member proximal end 104 and the second member proximal end 110, are tapered at their respective abutting faces such that the first member proximal end 104, and the second member proximal end 110 are capable of being adjoined, as shown in FIG. 1.

It will be appreciated that the toy 100 includes outer planar surfaces 102A and 108A as scratching surfaces. It will further be appreciated that the incline of the outer planar surfaces 102A and 108A create a unique scratching and stimulation experience for a cat.

In at least one embodiment of the present disclosure, the toy 100 includes a cavity 126 created by the inner surfaces of the first member 102, second member 108, first bar member 122, and second bar member 124. It will be appreciated that the cavity 126 creates an additional stimulation experience for a cat.

In at least one embodiment of the present disclosure, the toy 100 includes a passage 128 created by the inner surface of the first member distal end 106, inner surface of the second member distal end 112, and outer surface of first bar member 122, and outer surface of the second bar member 124. It will be appreciated that the passage 128 creates a crawling experience for a cat as stimulation.

In at least one embodiment of the present disclosure, the first member proximal end 104 and the second member proximal end 110 may be hingably connected at 114, as shown in FIG. 1. It will be appreciated that the first member proximal end 104 and the second member proximal end 110 are only adjoined at one section, along the adjacent portions of the front faces 102B and 108B). It will be further appreciated that the first member proximal end 104 and the second member proximal end 110 may be hingably connected at 114 via any means known to one having ordinary skill in the art.

In at least one embodiment of the present disclosure, the first bar member 122 and the second bar member 124 are hingably connected at 120, and along the front face 102B and 108B, as shown in FIG. 1.

Figure 2:
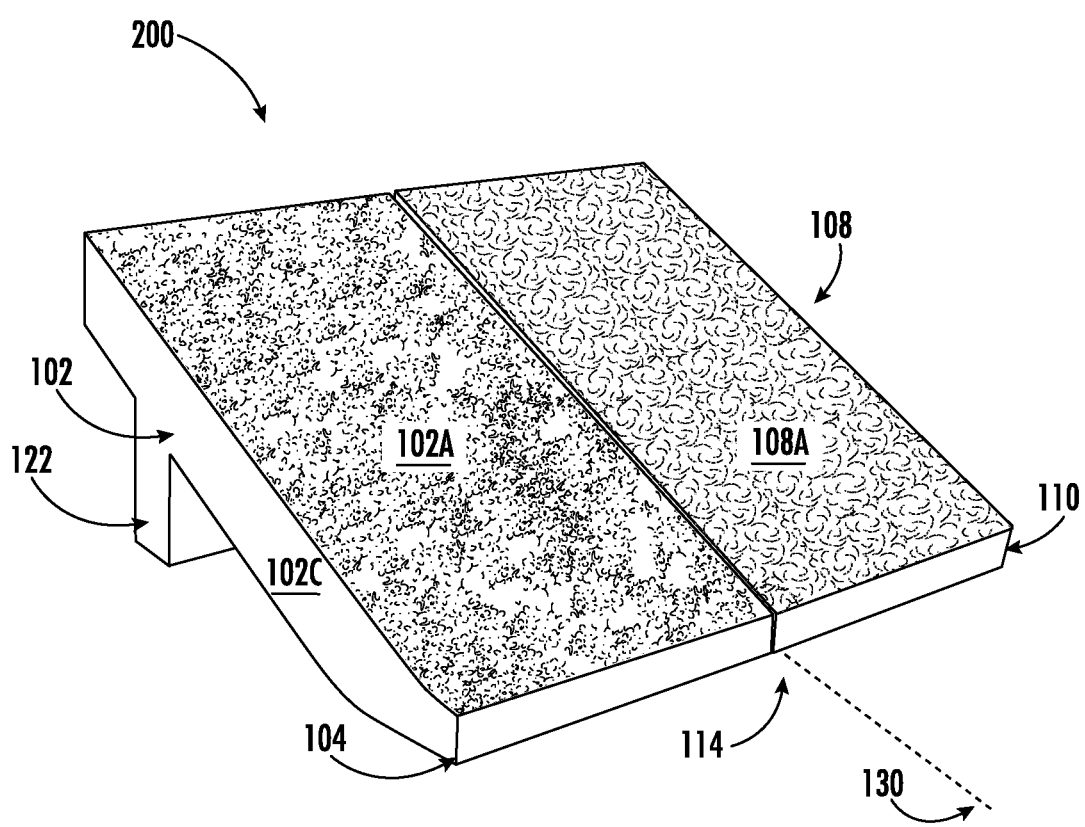
FIG. 2 is a front view of a configurable cat toy, in accordance with at least one embodiment of the present disclosure.

In at least one embodiment of the present disclosure, the toy 100 can be configured by operably pivoting the first member 102 and second member 108, along a longitudinal axis 130, such that first member face 102B and second member face 108B are abutting each other, as shown in FIG. 2. It will be appreciated that the first member 102 and second member 108 may still be hingably connected about the pivot 114. It will be further appreciated that the first member 102 and second member 108 may also be hingably connected at 120.

Referring now to FIG. 2, there is shown a re-configured toy 200, in a second position, according to at least one embodiment of the present disclosure. In at least one embodiment of the present disclosure, the toy 200 in the second position is substantially formed into the shape of a sloped structure, as further disclosed herein. As disclosed above, when first member 102 and second member 108 are operably pivoted along the axis 130, via the hingable connection at pivot 114 (and/or the hingable connection at 120), the toy 200 is formed, as shown in FIG. 2. It will be appreciated that the tapered ends of first member proximal end 104 and the second member proximal end 110, support lying flat the toy 200 such that the toy 200 is stable, and without appreciable wobble. It will be further appreciated that the toy 200 features a larger contiguous scratching surface comprised of the adjoined combined surface areas of the outer planar surfaces 102A and 108A, thereby allowing a cat to have a new toy variation for scratching and stimulation. It will further be appreciated that the incline of the combined outer planar surfaces 102A and 108A creates a sloped surface offering appreciably different and unique scratching and stimulation experiences for a cat.

Figure 3:
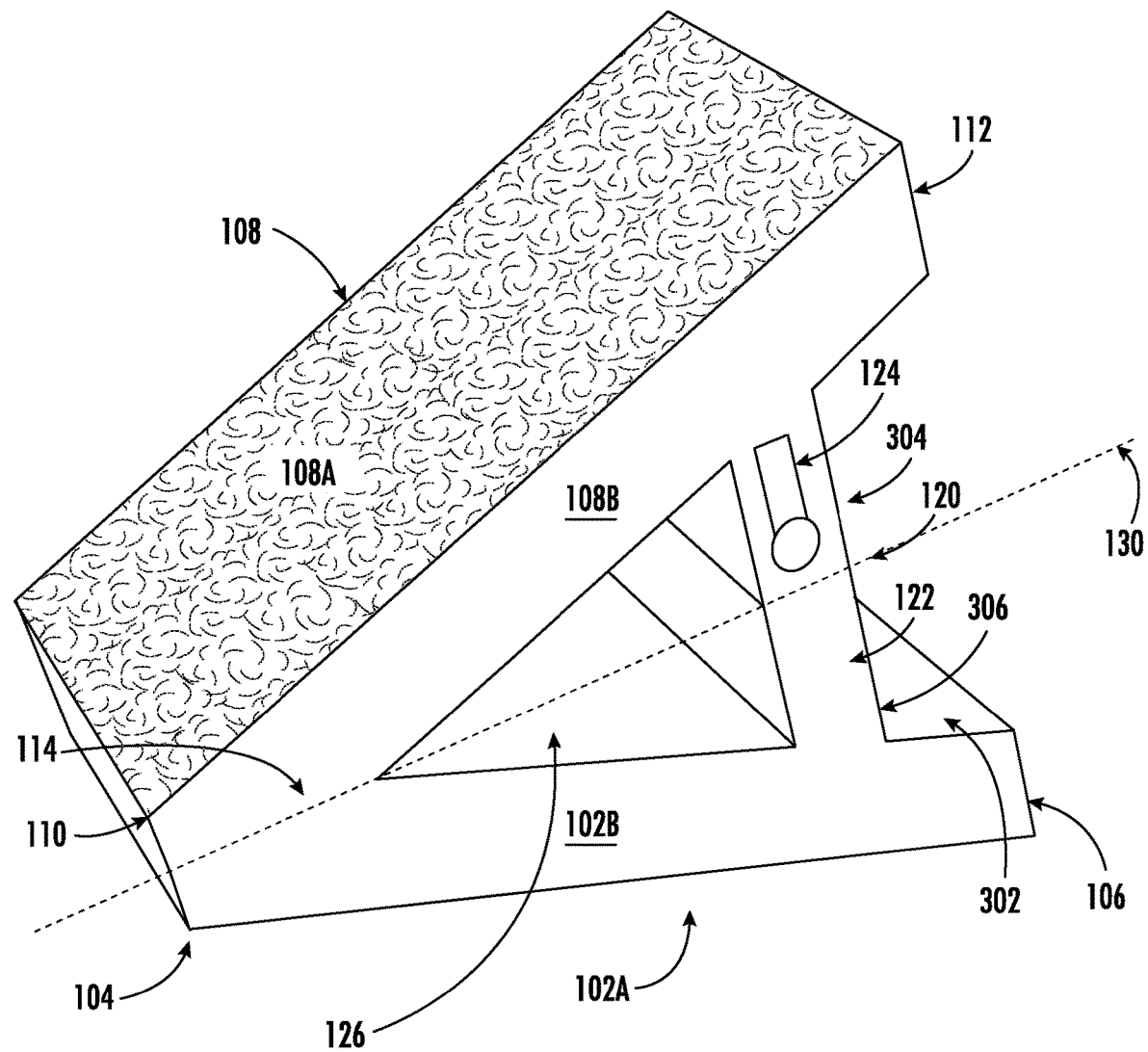
FIG. 3 is a side view of a configurable cat toy, in accordance with at least one embodiment of the present disclosure.

Referring now to FIG. 3, there is shown a configurable cardboard toy 300, in accordance with at least one embodiment of the present disclosure. In at least one embodiment of the present disclosure, the toy 100 is rotated such that the outer planar surface 102A operates as a base of the toy 300. In at least one embodiment of the present disclosure, the toy 100 may be rotated such that the outer planar surface 108A operates as a base of the toy 300. It will be appreciated that the toy 300 features additional scratch surfaces 302, 304, and 306. It will be further appreciated that the toy 300 features a different shape whereby outer planar surface 108A (or outer planar surface 102A) is in a shallower incline, thereby creating a different scratching and stimulation experience for a cat.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A configurable cat toy transformable between two different positions to provide different forms of the toy, comprising:
   a first member comprising a first member distal end, and a first member proximal end;
   a second member, being identical to the first member, and comprising a second member distal end, and a second member proximal end;
   a hingable connection operably connecting the first member proximal end and the second member proximal end in a first position;

wherein, the first member and second member are transformably rotatable relative to each other about the hingable connection, into a second position;

wherein, in the first position, the first member distal end and second member distal end extend divergently away from each other, the first member is opposite the second member to form the toy in a shape of letter A;

wherein, in the second position, the first member and second member are adjacent to each other and touching along their edges, and forming the toy in a sloped structure; and wherein the sloped structure comprises a combined surface of a first member outer planar surface and a second member outer planar surface.

2. The cat toy of claim 1, wherein the first member further comprises a first bar member situated between the first member distal end and the first member proximal end, and wherein the second member further comprises a second bar member between the second member distal end and the second member proximal end.

3. The cat toy of claim 2, wherein the first member is situated opposite the second bar member, and the first bar member is hingably connected at a first bar member distal end, to the second bar member at a second bar member distal end.

4. The cat toy of claim 3, wherein the hingable connection enables the first bar member and second bar member to be pivotably rotated to be situated adjacently to each other.

5. The cat toy of claim 1, further comprising a cavity enclosed by a first member inner planar surface, a second member inner planar surface, a first bar member inner planar surface, and a second bar member inner planar surface.

* * * * *